(12) United States Patent
Yamazaki et al.

(10) Patent No.: US 8,927,156 B2
(45) Date of Patent: *Jan. 6, 2015

(54) POWER STORAGE DEVICE

(75) Inventors: Shunpei Yamazaki, Tokyo (JP); Konami Izumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 859 days.

This patent is subject to a terminal disclaimer.

(21) Appl. No.: 12/699,085

(22) Filed: Feb. 3, 2010

(65) Prior Publication Data

US 2010/0209784 A1 Aug. 19, 2010

(30) Foreign Application Priority Data

Feb. 19, 2009 (JP) ................. 2009-036493

(51) Int. Cl.
| | |
|---|---|
| *H01M 2/16* | (2006.01) |
| *H01M 6/16* | (2006.01) |
| *H01M 10/052* | (2010.01) |
| *H01M 4/13* | (2010.01) |
| *H01M 4/139* | (2010.01) |
| *H01M 4/66* | (2006.01) |
| *H01M 4/70* | (2006.01) |
| *H01M 10/0569* | (2010.01) |
| *H01G 11/52* | (2013.01) |
| *H01G 11/70* | (2013.01) |

(52) U.S. Cl.
CPC .............. *H01M 10/052* (2013.01); *H01M 2/16* (2013.01); *H01M 4/13* (2013.01); *H01M 4/139* (2013.01); *H01M 4/667* (2013.01); *H01M 4/70* (2013.01); *H01M 10/0569* (2013.01); *H01G 11/52* (2013.01); *H01G 11/70* (2013.01); *H01M 2300/0045* (2013.01); *Y02E 60/122* (2013.01); *Y02E 60/13* (2013.01)

USPC .......................................... 429/246; 429/338

(58) Field of Classification Search
USPC ........................................ 429/209, 246, 247
See application file for complete search history.

(56) References Cited

U.S. PATENT DOCUMENTS

| | | | | |
|---|---|---|---|---|
| 5,641,591 | A * | 6/1997 | Kawakami et al. | ........ 429/231.5 |
| 7,147,971 | B2 | 12/2006 | Okamoto et al. | |
| 7,235,330 | B1 | 6/2007 | Fujimoto et al. | |

(Continued)

FOREIGN PATENT DOCUMENTS

| | | |
|---|---|---|
| CN | 1383580 A | 12/2002 |
| CN | 101356670 A | 1/2009 |

(Continued)

*Primary Examiner* — Muhammad Siddiquee
(74) *Attorney, Agent, or Firm* — Fish & Richardson P.C.

(57) ABSTRACT

An embodiment of the present invention relates to a power storage device which includes a positive electrode having a positive-electrode current collector with a plurality of first projections, a first insulator provided over each of the plurality of first projections, and a positive-electrode active material provided on a surface of the first insulator and the positive-electrode current collector with the plurality of first projections; a negative electrode having a negative-electrode current collector with a plurality of second projections, a second insulator provided over each of the plurality of second projections, and a negative-electrode active material provided on a surface of the second insulator and the negative-electrode current collector with the plurality of second projections; a separator provided between the positive electrode and the negative electrode; and an electrolyte provided in a space between the positive electrode and the negative electrode and containing carrier ions.

17 Claims, 4 Drawing Sheets

(56) References Cited

U.S. PATENT DOCUMENTS

| | | |
|---|---|---|
| 7,432,010 B2 | 10/2008 | Dokko |
| 7,521,151 B2 | 4/2009 | Hwang et al. |
| 7,592,099 B2 | 9/2009 | Tamura et al. |
| 8,110,307 B2 | 2/2012 | Iwamoto |
| 2002/0102464 A1 | 8/2002 | Yoshida et al. |
| 2002/0122985 A1 | 9/2002 | Sato et al. |
| 2005/0255233 A1 | 11/2005 | Madou et al. |
| 2007/0059584 A1 | 3/2007 | Nakano et al. |
| 2008/0153000 A1 | 6/2008 | Salot |
| 2008/0297981 A1 | 12/2008 | Endo et al. |
| 2009/0104515 A1 | 4/2009 | Fujikawa et al. |
| 2010/0003599 A1* | 1/2010 | Nonoshita et al. ............ 429/209 |
| 2010/0040951 A1 | 2/2010 | Yamamoto et al. |
| 2010/0227228 A1 | 9/2010 | Yamazaki et al. |

FOREIGN PATENT DOCUMENTS

| | | |
|---|---|---|
| EP | 0693792 A | 1/1996 |
| EP | 1978580 A | 10/2008 |
| EP | 2124273 A | 11/2009 |
| JP | 61-097910 A | 5/1986 |
| JP | 07-074057 A | 3/1995 |
| JP | 08-088022 A | 4/1996 |
| JP | 11-054383 A | 2/1999 |
| JP | 11-073947 A | 3/1999 |
| JP | 2002-025540 A | 1/2002 |
| JP | 2002-260635 A | 9/2002 |
| JP | 2002-289174 A | 10/2002 |
| JP | 2003-212529 A | 7/2003 |
| JP | 2003-317707 A | 11/2003 |
| JP | 2004-220926 A | 8/2004 |
| JP | 2005-019156 A | 1/2005 |
| JP | 2005-116248 A | 4/2005 |
| JP | 2005101409 | 4/2005 |
| JP | 2005-149891 A | 6/2005 |
| JP | 2006-059558 A | 3/2006 |
| JP | 2007-095590 A | 4/2007 |
| JP | 2007-299580 A | 11/2007 |
| JP | 2008-159589 A | 7/2008 |
| JP | 2008-243888 A | 10/2008 |
| JP | 2008-244210 A | 10/2008 |
| JP | 2008-294314 A | 12/2008 |
| JP | 2008-309651 A | 12/2008 |
| JP | 2009-021449 A | 1/2009 |
| WO | 2008/059937 A1 | 5/2008 |
| WO | WO-2008/111315 | 9/2008 |

* cited by examiner

POWER STORAGE DEVICE

BACKGROUND OF THE INVENTION

1. Field of the Invention

The invention disclosed in this specification relates to power storage devices.

2. Description of the Related Art

In recent years, power storage devices, such as lithium-ion secondary batteries, which are secondary batteries where lithium metal oxide is used as a battery material and which are charged and discharged by the movement of lithium ions as carrier ions between a positive electrode and a negative electrode, and lithium-ion capacitors, have been actively developed (see References 1 to 3).

REFERENCES

[Reference 1] Japanese Published Patent Application No. 2008-294314
[Reference 2] Japanese Published Patent Application No. 2002-289174
[Reference 3] Japanese Published Patent Application No. 2007-299580

SUMMARY OF THE INVENTION

In order to obtain a power storage device with high capacity, the surface areas of a positive electrode and a negative electrode should be increased. The surface areas of a positive electrode and a negative electrode can be increased by providing a surface of each of the positive electrode and the negative electrode with projections and depressions.

A high-capacity power storage device can be obtained by interposing a separator between a positive electrode and a negative electrode having projections and depressions and by providing an electrolyte between the positive electrode and the negative electrode.

However, the positive or negative electrode may expand due to charging, and with that pressure, the separator may be broken and defective short circuit may be caused.

In addition, if pressure is applied to a separator between a positive electrode and a negative electrode in a thin, small-sized power storage device, the separator may easily be broken.

A surface of each of a positive-electrode current collector and a negative-electrode current collector is provided with a plurality of projections, and over each of the projections, an insulator is disposed to relieve pressure that is to be applied to a separator.

An embodiment of the present invention relates to a power storage device including: a positive electrode having a positive-electrode current collector with a plurality of first projections, a first insulator provided over each of the plurality of first projections, and a positive-electrode active material provided on a surface of the first insulator and the positive-electrode current collector with the plurality of first projections; a negative electrode having a negative-electrode current collector with a plurality of second projections, a second insulator provided over each of the plurality of second projections, and a negative-electrode active material provided on a surface of the second insulator and the negative-electrode current collector with the plurality of second projections; a separator provided between the positive electrode and the negative electrode; and an electrolyte provided in a space between the positive electrode and the negative electrode and containing carrier ions. Each of the first projections and the second projections has a height to width ratio of 10 to 1000.

Each of the first insulator and the second insulator may be any one of, or a stacked layer of two or more of, an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

The carrier ions may be alkali metal ions or alkaline earth metal ions. The alkali metal ions may be lithium (Li) ions or sodium (Na) ion, and the alkaline earth metal ions may be magnesium (Mg) ions or calcium (Ca) ions.

Because the surface of each of the positive-electrode current collector and the negative-electrode current collector is provided with the plurality of projections, the surface area is increased and a power storage device with high capacity can be obtained.

In addition, because the projections are formed by etching, a thin, small-sized power storage device can be obtained.

Furthermore, because the insulator is provided over each of the plurality of projections, even when pressure is applied between the positive electrode and the negative electrode, the insulator absorbs or disperses the pressure so as to prevent breaking of the separator. Accordingly, a highly reliable power storage device can be obtained.

DETAILED DESCRIPTION OF THE INVENTION

Figure 1:
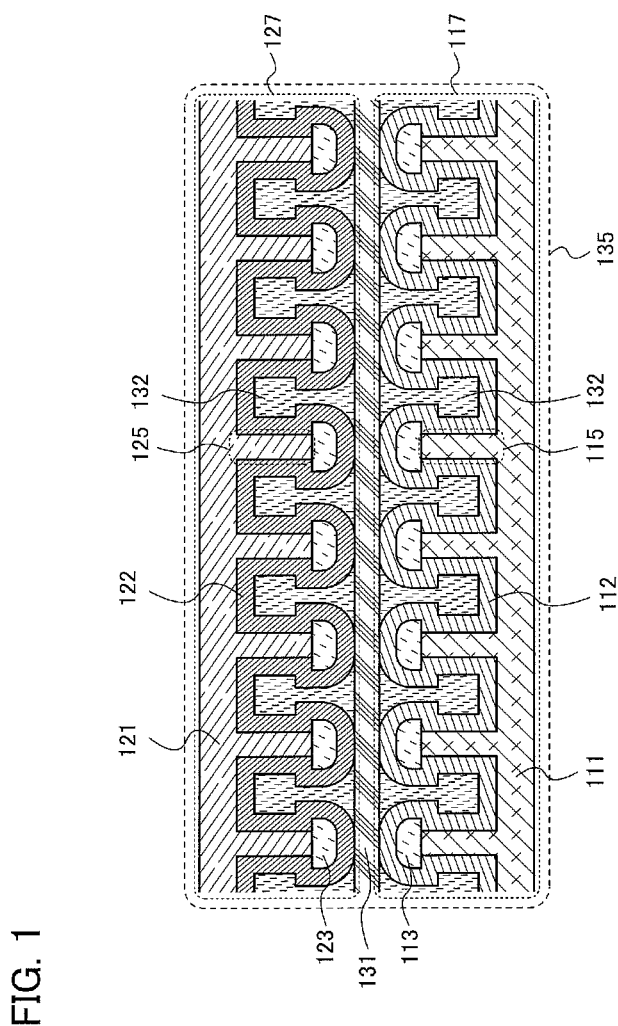
FIG. 1 is a cross-sectional view illustrating a manufacturing process of a power storage device.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the invention disclosed in this specification should not be interpreted as being limited to the description in the embodiments. Note that in the accompanying drawings, the same portions or portions having similar functions are denoted by the same reference numerals, and repetitive description thereof is omitted.

Embodiment 1

This embodiment is described with reference to FIG. 1, FIGS. 2A to 2D, FIGS. 3A to 3D, and FIGS. 4A and 4B.

Figure 2A:
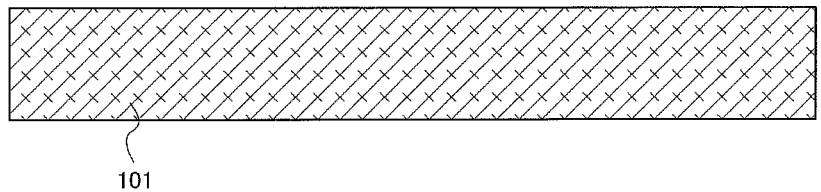
FIGS. 2A to 2D are cross-sectional views illustrating a manufacturing process of a power storage device.
Figure 2B:
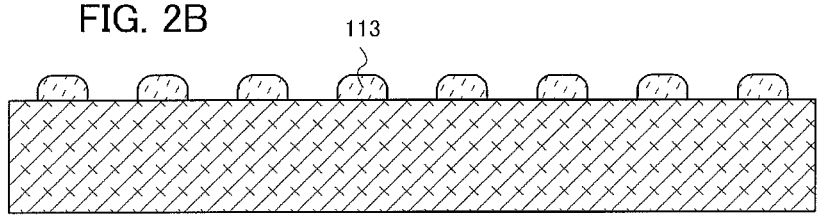

Over a plate-like positive-electrode material 101 (see FIG. 2A) which is a material of a positive-electrode current collector 111, a plurality of insulators 113 serving as an etching mask are formed (see FIG. 2B).

As the plate-like positive-electrode material 101, a simple substance, such as aluminum (Al) or titanium (Ti), or a compound thereof may be used.

Examples of the insulators 113 include organic resins such as an acrylic resin, a polyimide resin, a polyimide amide resin, a phenol resin, and an epoxy resin. The insulators 113 may be formed with such an organic resin by a printing method, a spin-coating method, or the like. For example, the insulators 113 may be formed as follows: unexposed photosensitive acrylic is formed over a surface of the plate-like positive-electrode material 101 by a printing method and regions where the insulators 113 are to be formed are exposed to light.

Figure 2C:
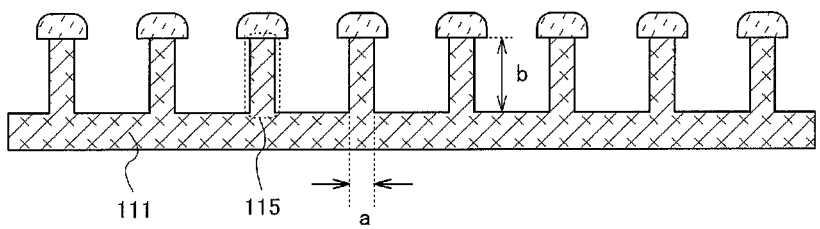
Figure 2D:
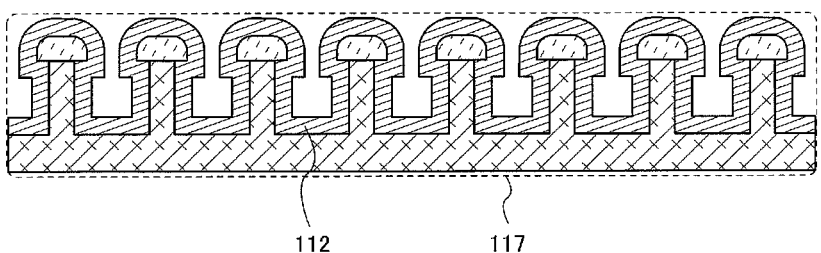

Next, with the use of the insulators 113 as a mask, the plate-like positive-electrode material 101 is anisotropically etched by a dry etching method. Accordingly, the positive-electrode current collector 111 is formed, which includes a plurality of projections 115 having a ratio of height b to width a of 10 to 1000, e.g., having a width a of 1 μm to 10 μm and a height b of 10 μm to 1000 μm, preferably, having a width a of 1 μm to 10 μm and a height b of 10 μm to 100 μm, or a width a of 1 μm and a height b of 10 μm (see FIG. 2C). FIG. 2C is a cross-sectional view, in which the positive-electrode current collector 111 is illustrated as having a comb-like shape. However, the projections 115 are also formed in rows behind those illustrated, and thus, the positive-electrode current collector 111 has a shape like a pin frog (spikes).

In the case of using a plate-like positive-electrode material 101 which is difficult to etch by dry etching, the projections 115 may be formed by a different method such as mechanical processing, screen printing, electroplating, or hot embossing. Even in the case of using a plate-like positive-electrode material 101 which can be etched by dry etching, the projections 115 may be formed by any of these methods.

Next, a positive-electrode active material 112 is formed over the positive-electrode current collector 111 and the insulators 113. Accordingly, a positive electrode 117 is formed (see FIG. 2D).

As the positive-electrode active material 112, a metal compound (oxide, sulfide, or nitride) having a layered structure can be used. In addition, as the positive-electrode active material 112 for a capacitor, activated carbon can be used. Furthermore, as the positive-electrode active material 112 for a lithium-ion secondary battery where lithium ions are used as carrier ions, a lithium-containing composite oxide represented by a chemical formula $Li_xM_yO_2$ (note that M represents Co, Ni, Mn, V, Fe, or Ti, and x is in the range of from 0.2 to 2.5 and y is in the range of from 0.8 to 1.25), such as $LiCoO_2$ or $LiNiO_2$, may be used. Note that in the case where the aforementioned lithium-containing composite oxide represented by the chemical formula $Li_xM_yO_2$ is used as the positive-electrode active material 112 of a lithium-ion secondary battery, M may include either one element or two or more elements. In other words, as the positive-electrode active material 112 of a lithium-ion secondary battery, a multi-element, lithium-containing composite oxide may be used.

Figure 3A:
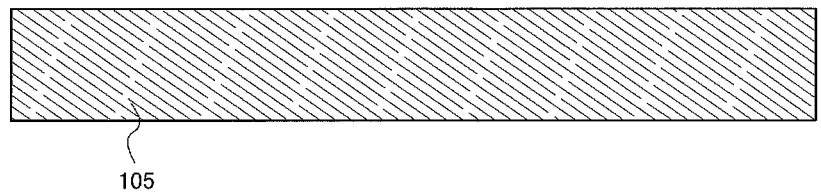
FIGS. 3A to 3D are cross-sectional views illustrating a manufacturing process of a power storage device.
Figure 3B:
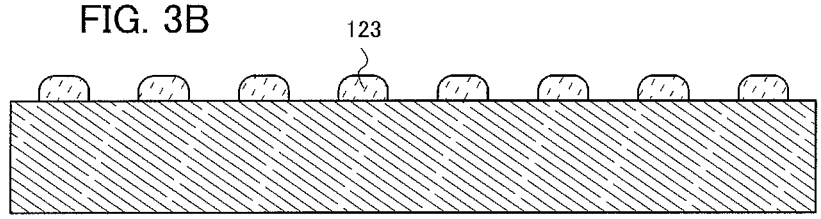

On the other hand, over a plate-like negative electrode material 105 which is a material of a negative-electrode current collector 121 (see FIG. 3A), a plurality of insulators 123 serving as an etching mask are formed (see FIG. 3B).

As the plate-like negative-electrode material 105, a simple substance, such as copper (Cu), aluminum (Al), nickel (Ni), or titanium (Ti), or a compound thereof may be used.

The insulators 123 may be formed with a material and by a manufacturing method which are similar to those of the insulators 113.

Figure 3C:
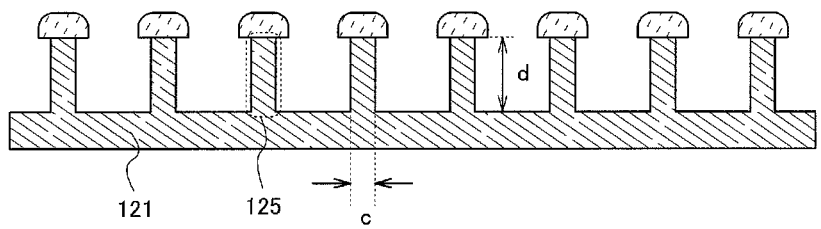
Figure 3D:
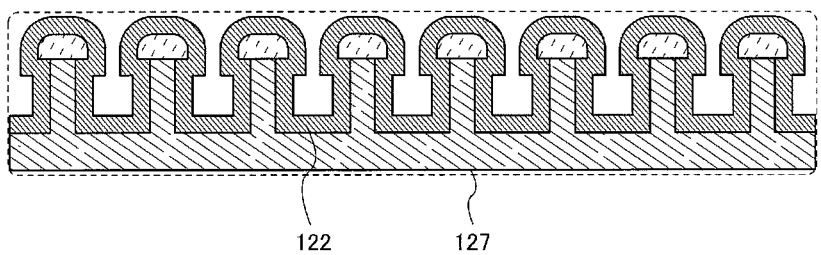

Next, with the use of the insulators 123 as a mask, the plate-like negative-electrode material 105 which can be etched by dry etching is anisotropically etched by a dry etching method. Accordingly, the negative-electrode current collector 121 is formed, which includes a plurality of projections 125 having a ratio of height d to width c of 10 to 1000, e.g., having a width c of 1 μm to 10 μm and a height d of 10 μm to 1000 μm, preferably, having a width c of 1 μm to 10 μm and a height d of 10 μm to 100 μm, or a width c of 1 μm and a height d of 10 μm (see FIG. 3C). FIG. 3C is a cross-sectional view, in which the negative-electrode current collector 121 is illustrated as having a comb-like shape. However, the projections 125 are also formed in rows behind those illustrated, and thus, the negative-electrode current collector 121 has a shape like a pin frog (spikes).

In the case of using a plate-like negative-electrode material 105 which is difficult to etch by dry etching, the projections 125 may be formed by a different method such as mechanical processing, screen printing, electroplating, or hot embossing. Even in the case of using a plate-like negative-electrode material 105 which can be etched by dry etching, the projections 125 may be formed by any of these methods.

Next, a negative-electrode active material 122 is formed over the negative-electrode current collector 121 and the insulators 123. Accordingly, a negative electrode 127 is formed (see FIG. 3D).

As the negative-electrode active material 122, a lithium-ion holding body such as a carbon material, a silicon material, or a silicon alloy material, which is capable of occluding and releasing alkali metal ions as carrier ions such as lithium ions, is used. As such a carbon material, powdered or fibrous graphite or the like can be used. As such a silicon material, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased. In a lithium-ion capacitor where lithium ions are used as carrier ions, for example, a material obtained by impregnating the aforementioned lithium-ion holding body with metallic lithium may be used. In other words, a material obtained by impregnating the aforementioned carbon material, silicon material, silicon alloy material, or the like with metallic lithium may be used as the negative-electrode active material 122.

Next, the positive electrode 117 and the negative electrode 127 are disposed to face each other, and a separator 131 is provided between the positive electrode 117 and the negative electrode 127.

As the separator 131, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. Note that a material which does not dissolve in an electrolyte 132 mentioned below should be selected.

More specific examples of materials of the separator 131 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, which can be used either alone or in combination.

The separator 131 is interposed between the projections 115 of the positive-electrode current collector 111 and the projections 125 of the negative-electrode current collector 121 and thus may be broken by application of pressure. However, because the insulators 113 are provided over the projections 115 and the insulators 123 are provided over the projections 125, the insulators 113 and the insulators 123 absorb or suppress pressure and can prevent the separator 131 from being broken. Accordingly, the positive electrode 117 and the negative electrode 127 can be prevented from being in contact with each other and short-circuited.

The electrolyte 132 is provided in a space between the positive electrode 117 and the negative electrode 127. Through the above process, a power storage device 135 is manufactured (see FIG. 1).

The electrolyte 132 contains alkali metal ions as carrier ions, such as lithium ions, and the lithium ions are responsible for electrical conduction. The electrolyte 132 includes a solvent and a lithium salt which dissolves in the solvent. Examples of lithium salts include $LiPF_6$ (lithium hexafluorophosphate), $LiClO_4$, $LiBF_4$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, $LiN(C_2F_5SO_2)$, $LiPF_3(CF_3)_3$, $LiPF_3(C_2F_5)_3$, and the like, which can be used for the electrolyte 132, either alone or in combination.

Note that in the description of this specification, alkali metal ions such as lithium (Li) ions are used as carrier ions; instead of lithium ions, alkali metal ions such as sodium (Na) ions may be used. Furthermore, alkaline earth metal ions such as magnesium (Mg) ions or calcium (Ca) ions may be used.

In the case of manufacturing a capacitor where such carrier ions are used and the negative-electrode active material 122 is impregnated with a metal of the same kind as that of the carrier ions, the aforementioned carbon material, silicon material, silicon alloy material, or the like, which is capable of occluding and releasing the carrier ions, may be impregnated with the metal.

Examples of the solvent of the electrolyte 132 include: cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (hereinafter abbreviated as EMC), methylpropyl carbonate (MPC), methylisobutyl carbonate (MIPC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane; alkyl phosphate esters such as trimethyl phosphate, triethyl phosphate, and trioctyl phosphate and fluorides thereof. These materials can be used either alone or in combination.

Figure 4A:
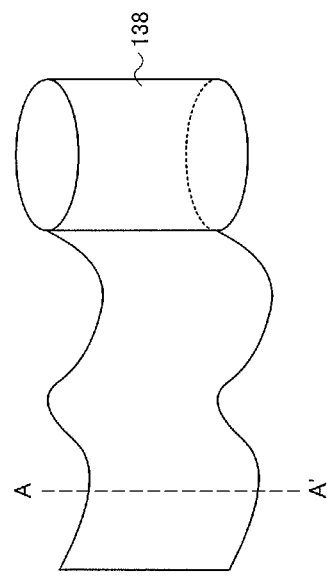
FIGS. 4A and 4B are a perspective view and a cross-sectional view of a power storage device.
Figure 4B:
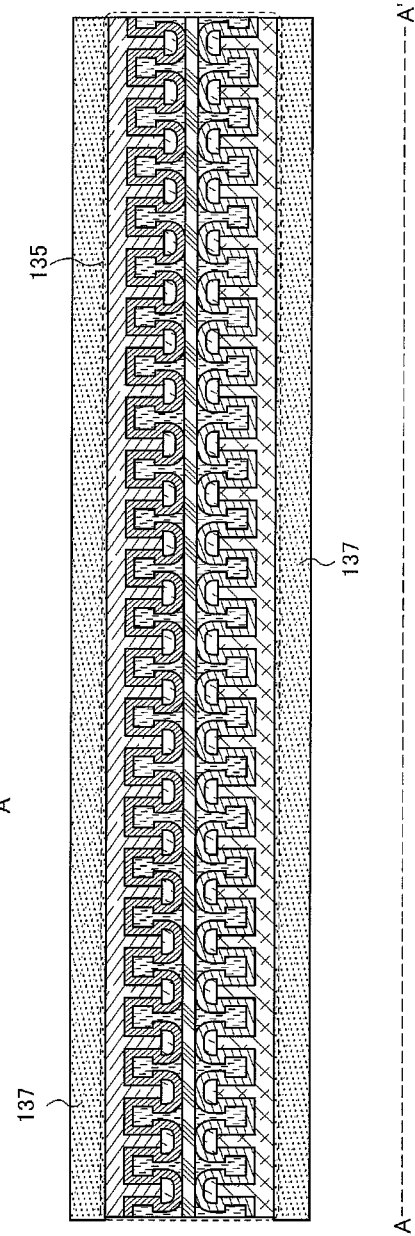

The power storage device 135 manufactured in the above manner may be used with a substrate 137 attached to its surface, if necessary (see FIG. 4B). As the substrate 137, a substrate which functions as a sealing layer may be selected, or a substrate which functions as a protector may be selected. Furthermore, a substrate which functions as both a sealing layer and a protector may be selected, or a substrate which functions as a sealing layer and a substrate which functions as a protector may be stacked.

The power storage device 135 may be used in a long plate-like shape, or the power storage device 135 in a long plate-like shape may be rolled into a cylindrical power storage device 138, if necessary (see FIG. 4A). Note that FIG. 4B is a cross-sectional view taken along a line A-A' of FIG. 4A.

This application is based on Japanese Patent Application serial no. 2009-036493 filed with Japan Patent Office on Feb. 19, 2009, the entire contents of which are hereby incorporated by reference.

What is claimed is:

1. A power storage device comprising:
   a positive electrode including:
      a positive-electrode current collector with a plurality of first projections;
      a first insulator provided on each of the plurality of first projections; and
      a positive-electrode active material provided on the first insulator and the positive-electrode current collector;
   a negative electrode including:
      a negative-electrode current collector with a plurality of second projections;
      a second insulator provided on each of the plurality of second projections; and
      a negative-electrode active material provided on the second insulator and the negative-electrode current collector;
   a separator provided between and in contact with the positive electrode and the negative electrode; and
   an electrolyte provided in a first space between the positive electrode and the separator, and a second space between the negative electrode and the separator,
   wherein the electrolyte contains carrier ions,
   wherein a width of the first insulator is larger than a width of each of the plurality of first projections, and
   wherein each of the first insulator and the second insulator has a curved upper surface and a flat bottom surface.

2. The power storage device according to claim 1, wherein the first insulator and the second insulator is any one of an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

3. The power storage device according to claim 1, wherein the first insulator and the second insulator is a stacked layer including materials selected from an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

4. The power storage device according to claim 1, wherein the separator includes any one of fluorine-based polymer, polyethylene oxide, polypropylene oxide, polyethylene, polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric.

5. The power storage device according to claim 1, wherein the electrolyte includes any one of ethylene carbonate, propylene carbonate, butylene carbonate, vinylene carbonate, dimethyl carbonate, diethyl carbonate, ethylmethyl carbonate, methylpropyl carbonate, methylisobutyl carbonate, dipropyl carbonate, methyl formate, methyl acetate, methyl propionate, γ-butyrolactone, 1,2-dimethoxyethane, 1,2-diethoxyethane, ethoxymethoxy ethane, tetrahydrofuran, 2-methyltetrahydrofuran, dimethylsulfoxide, 1,3-dioxolane, trimethyl phosphate, triethyl phosphate, trioctyl phosphate, and fluorides of the trimethyl phosphate, the triethyl phosphate, and the trioctyl phosphate.

6. A power storage device comprising:
   a positive electrode including:
      a positive-electrode current collector;
      a positive-electrode active material provided on the positive-electrode current collector;

a negative electrode including:
a negative-electrode current collector with a plurality of first projections;
a first insulator provided on each of the plurality of first projections; and
a negative-electrode active material provided on the first insulator and the negative-electrode current collector;
a layer comprising polymer between and in contact with the positive electrode and the negative electrode;
an electrolyte provided between the positive electrode and the layer, and in a space between the negative electrode and the layer,
wherein the electrolyte contains carrier ions,
wherein a width of the first insulator is larger than a width of each of the plurality of first projections, and
wherein the first insulator has a curved upper surface and a flat bottom surface.

7. The power storage device according to claim 6, wherein the first insulator is any one of an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

8. The power storage device according to claim 6, wherein the first insulator is a stacked layer including materials selected from an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

9. The power storage device according to claim 6, wherein the layer is a separator.

10. The power storage device according to claim 6, wherein the polymer is selected from any one of fluorine-based polymer, polyethylene oxide, polypropylene oxide, polyethylene, polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric.

11. A power storage device comprising:
a positive electrode including:
a positive-electrode current collector;
a positive-electrode active material provided on the positive-electrode current collector;
a negative electrode including:
a negative-electrode current collector with a plurality of first projections;
a first insulator provided on each of the plurality of first projections; and
a negative-electrode active material provided on the first insulator and the negative-electrode current collector;
a separator in contact with the positive electrode and the negative electrode; and
an electrolyte provided between the positive electrode and the separator, and in a space between the negative electrode and the separator,
wherein the electrolyte contains carrier ions,
wherein a width of the first insulator is larger than a width of each of the plurality of first projections, and
wherein the first insulator has a curved upper surface and a flat bottom surface.

12. The power storage device according to claim 11, wherein the first insulator is any one of an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

13. The power storage device according to claim 11, wherein the first insulator is a stacked layer including materials selected from an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

14. The power storage device according to claim 11, wherein the electrolyte includes any one of ethylene carbonate, propylene carbonate, butylene carbonate, vinylene carbonate, dimethyl carbonate, diethyl carbonate, ethylmethyl carbonate, methylpropyl carbonate, methylisobutyl carbonate, dipropyl carbonate, methyl formate, methyl acetate, methyl propionate, γ-butyrolactone, 1,2-dimethoxyethane, 1,2-diethoxyethane, ethoxymethoxy ethane, tetrahydrofuran, 2-methyltetrahydrofuran, dimethylsulfoxide, 1,3-dioxolane, trimethyl phosphate, triethyl phosphate, trioctyl phosphate, and fluorides of the trimethyl phosphate, the triethyl phosphate, and the trioctyl phosphate.

15. The power storage device according to claim 1, wherein at least the upper surface of the first insulator is surrounded by the positive-electrode active material, and
wherein at least the upper surface of the second insulator is surrounded by the negative-electrode active material.

16. The power storage device according to claim 6, wherein at least the upper surface of the first insulator is surrounded by the negative-electrode active material.

17. The power storage device according to claim 11, wherein at least the upper surface of the first insulator is surrounded by the negative-electrode active material.

* * * * *